(12) United States Patent
Gossweiler, III

(10) Patent No.: US 8,392,986 B1
(45) Date of Patent: Mar. 5, 2013

(54) EVALUATING TEXT-BASED ACCESS STRINGS

(75) Inventor: Richard Carl Gossweiler, III, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 682 days.

(21) Appl. No.: 12/486,714

(22) Filed: Jun. 17, 2009

(51) Int. Cl.
*G06F 15/16* (2006.01)
*G06F 9/32* (2006.01)

(52) U.S. Cl. ............. 726/19; 726/4; 726/5; 726/22; 726/16; 726/23; 713/172; 713/184; 713/185

(58) Field of Classification Search .............. 726/19
See application file for complete search history.

(56) References Cited

U.S. PATENT DOCUMENTS

| | | | |
|---|---|---|---|
| 5,347,628 A | 9/1994 | Brewer et al. | |
| 6,128,397 A | 10/2000 | Baluja et al. | |
| 6,195,698 B1 * | 2/2001 | Lillibridge et al. | 709/225 |
| 6,278,455 B1 | 8/2001 | Baker | |
| 6,295,387 B1 | 9/2001 | Burch | |
| 6,956,966 B2 | 10/2005 | Steinberg | |
| 7,149,899 B2 | 12/2006 | Pinkas et al. | |
| 7,266,693 B1 | 9/2007 | Potter et al. | |
| 7,624,277 B1 | 11/2009 | Simard et al. | |
| 7,653,944 B2 | 1/2010 | Chellapilla et al. | |
| 7,656,402 B2 | 2/2010 | Abraham et al. | |
| 7,841,940 B2 | 11/2010 | Bronstein | |
| 7,891,005 B1 | 2/2011 | Baluja et al. | |
| 7,908,223 B2 | 3/2011 | Klein et al. | |
| 7,921,454 B2 | 4/2011 | Cerruti | |
| 7,929,805 B2 | 4/2011 | Wang et al. | |
| 8,019,127 B2 | 9/2011 | Misra | |
| 8,073,912 B2 * | 12/2011 | Kaplan | 709/206 |
| 8,090,219 B2 | 1/2012 | Gossweiler et al. | |
| 8,103,960 B2 | 1/2012 | Hua et al. | |
| 8,136,167 B1 | 3/2012 | Gossweiler et al. | |
| 8,196,198 B1 | 6/2012 | Eger | |
| 2002/0141639 A1 | 10/2002 | Steinberg | |
| 2003/0080842 A1 | 5/2003 | Sumakeris et al. | |
| 2003/0232320 A1 | 12/2003 | Lee | |
| 2004/0073813 A1 | 4/2004 | Pinkas et al. | |
| 2004/0199597 A1 | 10/2004 | Libbey et al. | |
| 2005/0014118 A1 | 1/2005 | Von Ahn Arellano | |
| 2005/0065802 A1 | 3/2005 | Rui et al. | |
| 2005/0229251 A1 | 10/2005 | Chellapilla et al. | |

(Continued)

FOREIGN PATENT DOCUMENTS

WO 2008/091675 A1 7/2008

OTHER PUBLICATIONS

Vailaya, A., et al, "Automatic Image Orientation Detection", IEEE Transactions on Image Processing, vol. 11, No. 7, Jul. 2002, pp. 746-755.

(Continued)

*Primary Examiner* — Krisna Lim
*Assistant Examiner* — Arvin Eskandarnia
(74) *Attorney, Agent, or Firm* — Brake Hughes Bellermann LLP

(57) ABSTRACT

A computer-implemented method may include presenting to multiple users a test text string each time an access text string is presented to the users, receiving input related to the test text string from the users and using by an evaluation processor the input related to the test text string to validate the test text string as a candidate to use as a future access text string.

30 Claims, 7 Drawing Sheets

U.S. PATENT DOCUMENTS

| | | | |
|---|---|---|---|
| 2006/0015812 | A1 | 1/2006 | Cunningham et al. |
| 2006/0021024 | A1 | 1/2006 | Park |
| 2006/0167874 | A1 | 7/2006 | von Ahn Arellano et al. |
| 2007/0130618 | A1 | 6/2007 | Chen |
| 2007/0201745 | A1 | 8/2007 | Wang et al. |
| 2007/0234423 | A1 | 10/2007 | Goodman et al. |
| 2008/0050018 | A1 | 2/2008 | Kozlol |
| 2008/0216163 | A1 | 9/2008 | Pratte |
| 2008/0244700 | A1 | 10/2008 | Osborn et al. |
| 2009/0046929 | A1 | 2/2009 | De Leon |
| 2009/0094687 | A1 | 4/2009 | Jastrebski |
| 2009/0113294 | A1* | 4/2009 | Sanghavi et al. ............. 715/269 |
| 2009/0138468 | A1 | 5/2009 | Kurihara |
| 2009/0138723 | A1 | 5/2009 | Nyang |
| 2009/0150983 | A1 | 6/2009 | Saxena et al. |
| 2009/0235178 | A1 | 9/2009 | Cipriani et al. |
| 2009/0249476 | A1 | 10/2009 | Seacat |
| 2009/0249477 | A1* | 10/2009 | Punera ........................... 726/18 |
| 2009/0293119 | A1 | 11/2009 | Jonsson |
| 2009/0319274 | A1 | 12/2009 | Gross |
| 2009/0320124 | A1 | 12/2009 | Taxier et al. |
| 2009/0325696 | A1 | 12/2009 | Gross |
| 2009/0328150 | A1 | 12/2009 | Gross |
| 2010/0077209 | A1 | 3/2010 | Broder et al. |
| 2010/0077210 | A1* | 3/2010 | Broder et al. ................. 713/168 |
| 2010/0100725 | A1* | 4/2010 | Ozzie et al. ................... 713/155 |

OTHER PUBLICATIONS

Zhang, L., et al, "Boosting Image Orientation Detection with Indoor vs. Outdoor Classification", Proceedings of the Sixth IEEE Workshop on Applications of Computer Vision, Dec. 2002, pp. 95-99.

Von Ahn, L., et al, "CAPTCHA: Using Hard AI Problems for Security", In Proceedings of Eurocrypt—Eurocrypt 2003, pp. 294-311.

Rui, Y., et al, "Characters or Faces: A User Study on Ease of Use for HIPs", In Proceedings of the 2nd International Workshop on Human Interactive Proofs, vol. 3517, Lecture Notes in Computer Science, May 2005, 14 pages.

Chellapilla, K., et al, "Computers Beat Humans at Single Character Recognition in Reading based Human Interaction Proofs (HIPs)", In Proceedings of the Second Conference on Email and Anti-Spam CEAS, (Jul. 2005), 8 pages.

Wu, Victor et al., "Text Finder: An Automatic System to Detect and Recognize Text In Images", IEEE Transactions on Pattern Analysis and Machine Intelligence, Nov. 18, 1997, 36 pages.

Wu, Victor et al., "Finding Text In Images", Proceedings of the 2nd ACM Int'l Conf. on Digital Libraries, 1997, pp. 1-14.

Von Ahn, L., "Games with a purpose", Invisible Computing, vol. 39, No. 6, Jun. 2006, pp. 96-98.

Rowley, H. A., et al, "Rotation Invariant Neural Network-Based Face Detection", CMU-CS-97-201, Dec. 1997, 15 pages.

Von Ahn, L, et al, "Improving Accessibility of the Web With a Computer Game", Proceedings of the SIGCHI Conference on Human Factors in Computing Systems, ACM, Apr. 22-28, 2006, pp. 79-82.

Von Ahn, L, et al, "Labeling Images With a Computer Game", Proceedings of the SIGCHI Conference on Human Factors in Computing Systems, ACM, Apr. 24-29, 2004, pp. 319-326.

Von Ahn, L, et al, "Telling Humans and Computers Apart (Automatically) or How Lazy Cryptographers do AI", Communications on the ACM, vol. 47, No. 2, Feb. 2004, pp. 1-11.

Viola, P., et al, "Rapid Object Detection Using a Boosted Cascade of Simple Features", IEEE of computer Society Conference on Vision and Pattern Recognition TR-2004-043, 2004, 13 pages.

Baluja, S., et al, "Large Scale Performance Measurement of Content-Based Automated Image-Orientation Detection", IEEE Int. Conference on Image Processing, vol. 2, 2005, pp. 514-517.

Mori, G., et al, "Recognizing Objects in Adversarial Clutter: Breaking a Visual CAPTCHA", Proceedings of Computer Vision and Pattern Recognition, 2003, pp. 1-8.

Rowley, H., et al, "Neural Network-Based Face Detection", IEEE Transactions on Pattern Analysis and Machine Intelligence, vol. 20, No. 1, Jan. 1998, pp. 1-28.

Fu, H., et al, "Upright Orientation of Man-Made Objects", SIGGRAPH 2008, 35th International Conference and Exhibition on Computer Graphics and Interactive Techniques, Aug. 2008, 7 pages.

Lopresti, D., "Leveraging the CAPTCHA Problem", 2nd Int'l Workshop on Human Interactive Proofs, May 2005, 15 pages.

Adamchak, et al, "A Guide to Monitoring and Evaluating Adolescent Reproductive Health Programs", Pathfinder International, FOCUS on Young Adults, 2000, pp. 265-274.

"Sampling Information", Minnesota Center for Survey Research—University of Minnesota, 2007, 4 pages.

Siegle, D., "Sample Size Calculator", Neag School of Education—University of Connecticut, retrieved on Sep. 18, 2008, from http://www.gifted.uconn.edu/siegle/research/Samples/samplecalculator.htm, 2 pages.

U.S. Appl. No. 12/254,312, filed Oct. 20, 2008.
U.S. Appl. No. 12/256,827, filed Oct. 23, 2008.
U.S. Appl. No. 12/254,325, filed Oct. 20, 2008.
U.S. Appl. No. 12/345,265, filed Dec. 29, 2008.
U.S. Appl. No. 12/486,714, filed Jun. 17, 2009.

Final Office Action Response for U.S. Appl. No. 12/254,325, filed May 10, 2012, 17 pages.

Final Office Action Response for U.S. Appl. No. 12/254,325, filed Jan. 26, 2012, 11 pages.

Non-Final Office Action Response for U.S. Appl. No. 12/345,265, filed Jan. 17, 2012, 11 pages.

Non-Final Office Action Response for U.S. Appl. No. 12/254,312, filed Oct. 14, 2011, 9 pages.

Non-Final Office Action Response for U.S. Appl. No. 12/606,465, filed Jan. 26, 2012, 26 pages.

Final Office Action for U.S. Appl. No. 12/606,465, mailed on May 9, 2012, 22 pages.

Hofmueller, et al, "Request for Comment: The Transmission of IP Datagrams over the Semaphore Flag Signaling System (SFSS)", Network Working Group, Apr. 1, 2007, 14 pages.

Non-Final Office Action for U.S. Appl. No. 12/254,325, mailed Sep. 1, 2011, 17 pages.

Non-Final Office Action for U.S. Appl. No. 12/606,465, mailed Aug. 19, 2011, 25 pages.

Shirali-Shahrea, Mohammad, "Collage CAPTCHA", IEEE, Computer Science Department, Sharif University of Technology, 2007, 4 pages.

Shirali-Shahreza, Mohammad, "Online Collage CAPTCHA", Wiamis '07, Eighth International Workshop on Digital Object Identifier, 2007, 4 pages.

American Heritage Dictionary of the English Language (online), Fourth Edition, Copyright 2007 by Houghton Mifflin Co., "figure" definition, retrieved from http://www.credoreference.com on Aug. 13, 2011, 4 pages.

Notice of Allowance for U.S. Appl. No. 12/345,265, mailed Feb. 8, 2012, 12 pages.

Office Action for U.S. Appl. No. 12/254,312, mailed on Sep. 14, 2011, 5 pages.

Notice of Allowance for U.S. Appl. No. 12/254,312, mailed Nov. 7, 2011, 19 pages.

Final Office Action for U.S. Appl. No. 12/254,325, mailed Feb. 10, 2012, 15 pages.

Non-Final Office Action for U.S. Appl. No. 12/345,265, mailed on Oct. 14, 2011, 23 pages.

Chew, et al, "Collaborative Filtering CAPTCHA's", HIP 2005, LNCS 3517, May 20, 2005, pp. 66-81.

First Office Action for Chinese Application No. 200880002917.8 (with English Translation), mailed on May 12, 2011, 7 pages.

Office Action for EP Application No. 08713263.5, mailed Dec. 23, 2011, 4 pages.

Extended EP Search Report for EP Application No. 08713263.5, mailed Feb. 4, 2011, 9 pages.

Lopresti, "Leveraging the CAPTCHA Problem", HIP 2005, LNCS 3517, May 20, 2005, 14 pages.

Xu, et al, "Mandatory Human Participation: A New Authentication Scheme for Building Secure Systems", Proceedings of the 12th International Conference on Computer Communications and Networks, Oct. 20, 2003, pp. 547-552.

Non-Final Office Action for U.S. Appl. No. 12/254,325, mailed Aug. 28, 2012, 19 pages.

Non-Final Office Action for U.S. Appl. No. 12/524,149, mailed Sep. 21, 2012, 34 pages.

Non-Final Office Action for U.S. Appl. No. 13/463,423, mailed Jul. 3, 2012, 24 pages.

Final Office Action Response for U.S. Appl. No. 13/463,423, filed Sep. 25, 2012, 11 pages.

Notice of Allowance for U.S. Appl. No. 13/463,423, mailed Oct. 16, 2012, 16 pages.

Luo, et al, "A Probabilistic Approach to Image Orientation Detection via Confidence-Based Integration of Low-Level and Semantic Cues", 2004, 8 pages.

* cited by examiner

EVALUATING TEXT-BASED ACCESS STRINGS

TECHNICAL FIELD

This document relates to systems and techniques for evaluating text-based access strings.

BACKGROUND

Computer security is becoming an ever more important feature of computing systems. As more computing resources on servers are made available over the Internet, and thus theoretically available to anyone, it becomes more important to ensure that only legitimate users, and not hackers or other fraudsters, are using the resources.

Computer security is commonly provided by requiring a user to submit credentials in the form of a password or pass code. For example, a web site may require a user to enter a password before being granted access. Also, certain web sites may require potential users to enter a term that is displayed to the users in an obscured manner so that automated processes cannot access the web sites for proper or improper purposes (e.g., to overload the web site servers). Such techniques may be commonly referenced as CAPTCHA's (Completely Automated Public Turing test to tell Computers and Humans Apart). A CAPTCHA should be easy for the user to resolve but difficult or impossible for a computer to resolve.

SUMMARY

This document describes systems and techniques that may be used to evaluate text-based access strings to determine which text strings are good candidates to use to limit access to computing services to legitimate users instead of machines or bots that may attempt to access the computing services. Computing services, which throughout this document, include computing devices and computing services (e.g., online computing services). In general, at least two text strings may be shown to a user, one of which is an access string to enable access to the computing service and one of which is a test string that is undergoing evaluation to determine whether it is a good candidate to use as an access string. After the test string has been presented to a threshold number of users, the inputs by the users to the test string are evaluated to determine whether or not the test string is a good candidate to use as an access string.

For instance, a statistical analysis may be performed on the inputs to the test string to validate the test string as a candidate for use as an access string. If the analysis indicates that the test string is a good candidate, then it may be added to a pool of access strings that are presented to users to gain access to a computing service. If the analysis indicates that the test string is not a good candidate because, for example, a large number of users cannot read the test string, then the test string is discarded and not added to the pool of access strings. In this manner, different types of text-based strings may be generated using different distortion algorithms and the text strings may be tested out on a sample of users to determine if they will be good to use as live access strings. In this manner, an appropriate level of hardness for the text-based string may be determined so that the text string is not too hard for a human to read, but is not too easy for a program or machine to read.

Also, in this manner, the results of presenting the test strings to multiple users may be used to determine whether the distortion or obscuring algorithms used to generate the strings are valid algorithms to use. For example, if a squiggle algorithm is used to generate the test string and if a very low percent of the text strings are readable, then the squiggle algorithm may not be used to generate other text strings.

In some exemplary implementations, multiple text strings may be presented to the user with some of them being used to enable access and some of them being test strings. If more than one text string is used for access, it is more difficult for a non-human to guess all of them correctly to gain access to the computing service.

In one exemplary implementation, the text strings are known when they are presented to users, meaning that the input provided by the users may be compared to the known answers to either provide access with respect to access text strings and to store and collect information about the test text strings.

In another exemplary implementation, one text string may be presented to the user, where the one text string includes multiple sub-strings. For instance, a first sub-string may be used as an access string and a second sub-string may be used as a test string undergoing validation.

According to one general aspect, a computer-implemented method may include presenting to a user a first text string and a second text string, where the first text string is designated as an access string and the second text string is designated as a test string, receiving a first input and a second input by the user, comparing by an access processor the first input to the first text string, providing access to a computing service based on the comparison by the access processor of the first input to the first text string, and using by an evaluation processor the second input as part of validating the second text string as a candidate to use for providing access.

Implementations may include one or more of the following features. For example, using the second input may include collecting the second input and other inputs from multiple other users related to the second text string and performing a statistical analysis by the evaluation processor on the second input and the other inputs related to the second text string to validate the second text string as a candidate to use for providing access. Performing the statistical analysis may include determining a variance by the evaluation processor.

The first text string and the second text string may each be automatically generated and distorted text strings. In one exemplary implementation, the first text string and the second text string may be presented side-by-side to the user. In another exemplary implementation, the first text string and the second text string may be presented temporally to the user. In another exemplary implementation, the first text string and the second text string may be presented by randomly varying a position in which the first text string and the second text string are presented.

In one exemplary implementation, the computer-implemented method may include denying access to the computing service by the access processor when the first input does not match the first text string and not using the second input to validate the second text string as a candidate to use for providing access. In another exemplary implementation, the computer-implemented may include denying access to the computing service by the access processor when the first input does not match the first text string and using the second input to validate the second text string as a candidate to use for providing access.

In another general aspect, a recordable storage medium may include recorded and stored instructions that, when executed, perform the actions of presenting to a user a first text string and a second text string, where the first text string is designated as an access string and the second text string is designated as a test string, receiving a first input and a second input by the user, comparing the first input to the first text string, providing access to a computing service based on the comparison of the first input to the first text string and using the second input as part of validating the second text string as a candidate to use for providing access. Implementations may include one or more of the features discussed above and below with respect to the other general aspects.

In another general aspect, a computer-implemented method may include presenting to multiple users a test text string each time an access text string is presented to the users, receiving input related to the test text string from the users and using by an evaluation processor the input related to the test text string to validate the test text string as a candidate to use as a future access text string.

Implementations may include one or more of the following features. For example, the computer-implemented method may further include receiving input related to the access text string from the users, comparing by an access processor the input related to the to the access text string and providing access to a computing service by the access processor when the input related to the access text string matches the access text string. Using the input related to the test text string may include performing a statistical analysis on the input related to the test string by the evaluation processor to validate the test text string as a candidate to use as a future access string.

The computer-implemented method may further include using by the evaluation processor the input related to the test text string to validate a distortion algorithm used to generate the test text string.

In another general aspect, a recordable storage medium may include recorded and stored instructions that, when executed, perform the actions of presenting to multiple users a test text string each time an access text string is presented to the users, receiving input related to the test text string from the users and using the input related to the test text string to validate the test text string as a candidate to use as a future access text string. Implementations may include one or more of the features discussed with respect to the other general aspects.

In another general aspect, a computer-implemented text string evaluation system may include an access server that is configured to receive requests for access, to present access text strings and test text strings to a user, and to receive input related to the access text strings and input related to the test text strings from the user and an evaluation processor that is configured to use the input related to the test text strings to validate the test text string as a candidate to use as a future access text string.

Implementations may include one or more of the following features. For example, the system may include a text string generator that is configured to generate text strings by randomly selecting characters, selecting a font, selecting a distortion algorithm and applying the selected font and the selected distortion algorithm to the randomly selected characters. The system may include a filter that is operably coupled with the text string generator and that is configured to determine whether the text strings generated by the text string generator are readable by a non-human. The evaluation processor may be configured to use the input related to the test text string to validate the distortion algorithm used to generate the test text string.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

This document describes systems and techniques for evaluating text-based access strings. Such techniques may include displaying at least two text-based strings to a user, where the text strings may be distorted in some way to make it more difficult for a non-human to read the text string. The user may be prompted to enter the text strings into one or more input boxes. Unbeknownst to the user, one of the text strings is a test text string and at least one of the text strings is an access text string. If the user properly enters the text for the access text string, the user may be provided access to a service. The input related to the test text string is collected and evaluated with inputs from other users for the same test text string to determine if it should be used in the future as an access string. In this manner, text strings may be evaluated to determine whether or not they may be too difficult for users to read and enter correctly.

In one exemplary implementation, the text-based strings that are presented to the users may be text CAPTCHAs. The text-based strings may be randomly generated and randomly distorted. In this manner, the text strings may be difficult for a machine or computer program to decipher and correctly input.

In general, the application may be used to evaluate text strings that are used to separate real human users of a service from automated systems that may attempt to break into a service. For example, the test text string evaluation application may be used to determine which text strings are good candidates to use to enable access to a web site or to access a feature or service (e.g., a subscription service) on a web site. Such applications may be used to prevent machines from overwhelming a site or a service such as, for example, a ticket ordering web site.

Figure 1A:
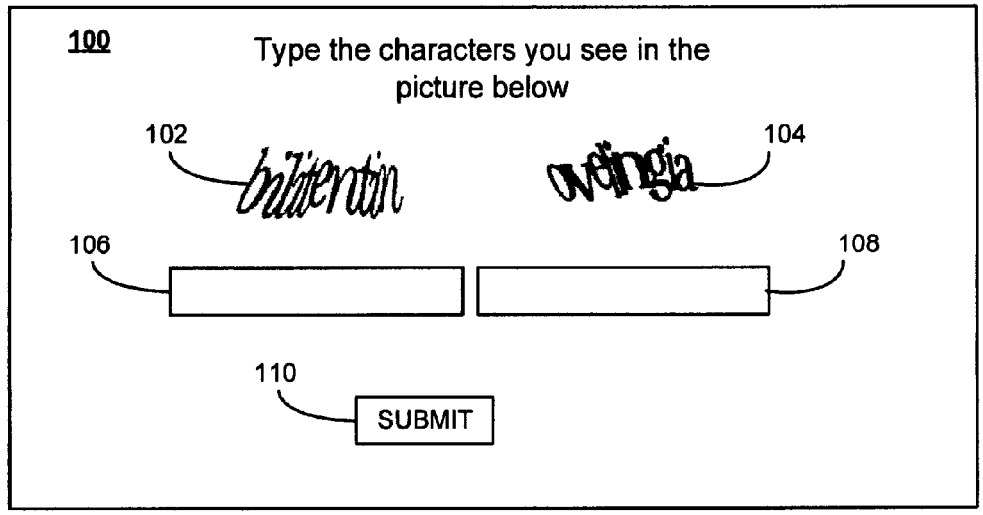
FIGS. 1A-1D show example screen shots of presenting text-based strings to a user.

Referring to FIG. 1A, an example block diagram of two text-based strings is illustrated. In this example block diagram, screen shot 100 may be displayed on a device to a user. For instance, the user may be trying to gain access to a computing service such as a web site that want to restrict access to prevent non-humans from entering the web site and flooding the web site with hits. Multiple text-based strings may be presented to the user as illustrated in the screen shot 100. In screen shot 100, a first text-based string 102 and a second text-based string 104 are presented to the user simultaneously. The user is asked to type the characters seen in the text-based strings 102 and 104. Two boxes 106 and 108 are provided for the user to input the characters from the text-based strings 102 and 104. When the user has typed the input into the boxes 106 and 108, then the user may enter the selections by depressing the submit button 110.

In this example, one of the text strings is an access text string meaning that if it is typed correctly into the corresponding input box, then the user is granted access. The other text string is a test text string, where the input that is typed into the corresponding input box is collected for evaluation. The user is not told which of the text strings is an access text string and which is a test text string. For instance, in one presentation to a user, the first text string 102 may be the access text string and the second text string 104 may be the test text string. If the user enters the first text string 102 correctly in the input box 106, then the user will be granted access upon selection of the submit button 110. The input in the input box 108 will be collected as part of the evaluation for the test text string. The user would be granted access even if the input box 108 does not match the second text string 104.

If the user enters the first text string 102 incorrectly in the input box 106, then the user will not be granted access upon selection of the submit button 110. The input in the input box 108 may or may not be used as part of the evaluation for the test text string. The user may be given multiple opportunities to enter the information correctly into the text box 106. The text strings 102 and 104 also may be replaced with other text strings to give the user an opportunity to gain access.

Figure 1B:
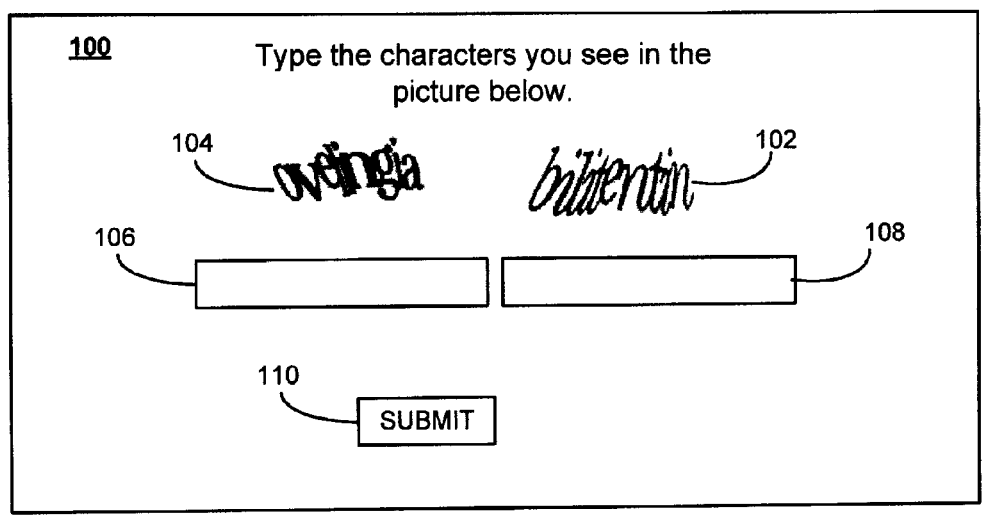

The placement of the test text string and the access text string may be random, with the access test string sometimes being on the left hand side and sometime being on the right hand side. FIG. 1B illustrates the same screen shot 100 except that the position of text strings 102 and 104 have been switched. By randomly placing the access text string and the test text string is varying positions, it is more difficult for a machine or program to determine that one of the text strings is only a test string. If the test text string were always placed on the right hand side, then the machine, or even a human for that matter, could ignore that text string and not input any characters into the corresponding input box, and yet still gain access to the computing service.

Figure 1C:
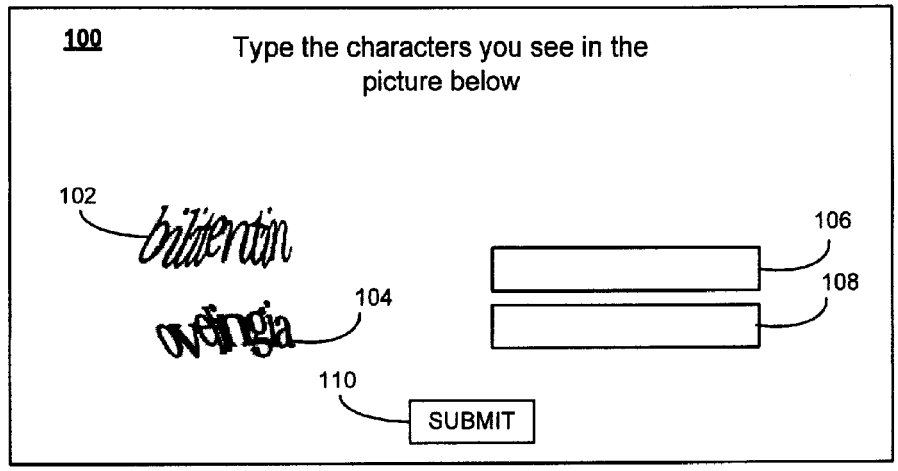

In FIGS. 1A and 1B, the text strings 102 and 104 are placed side-by-side. However, other placements of the text strings 102 and 104 are possible. FIG. 1C illustrates another example of the same screen shot 100, but with a different arrangement of the text strings 102 and 104. In this example, the text strings 102 and 104 are placed one on top of the other with the corresponding input boxes 106 and 108 next to the text strings 102 and 104 instead of below them. In each of these exemplary implementations, an accessibility option also may be presented in which a sequence of letters and/or numbers may be read out loud to the user so that the user can input the heard sequence to gain access.

Figure 1D:
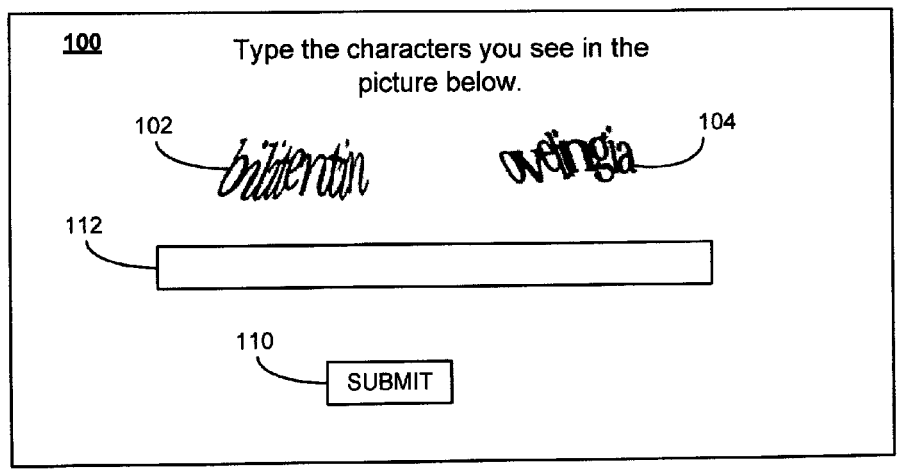

FIG. 1D illustrates the same screen 100, except that the two input boxes 106 and 108 have been replaced by a single input box 112. The user is still presented with at least two text strings 102 and 104, one of which is an access text string and one of which is a test text string. The user is prompted to enter the characters into the input box 112. The characters may be separated by a space in the input box 112 to distinguish between the end of the one text string and the beginning of the next text string. As discussed above, the first text string 102 may be the access text string and the second text string 104 may be the test text string. If the user enters the characters for the first text string correctly into the input box 112, then the user is granted access, even if the characters for the second text string 104 are entered incorrectly. The incorrect characters are still used in the evaluation of the second text string 104. If the user enters the characters for the first text string 102 incorrectly, then the user is denied access even if the characters are entered correctly for the second text string 104.

The text strings 102 and 104 may be presented to the user in various ways. FIGS. 1A-1D merely illustrate a few examples. However, other schemes and presentation formats are within the scope of this disclosure. In one exemplary implementation, one text string may be presented to the user, where the one text string includes multiple sub-strings. For instance, a single text string with or without spacing between the characters may be presented to the user, where the single text string includes the multiple sub-strings. For instance, a first sub-string may be used as an access string and a second sub-string may be used as a test string undergoing validation.

In another exemplary implementation, the text strings may be presented temporally as well as spatially to the user. For instance, one text string may be shown to the user, then the other text string is shown to the user and the results are used to grant access or validate a test text string.

Figure 2:
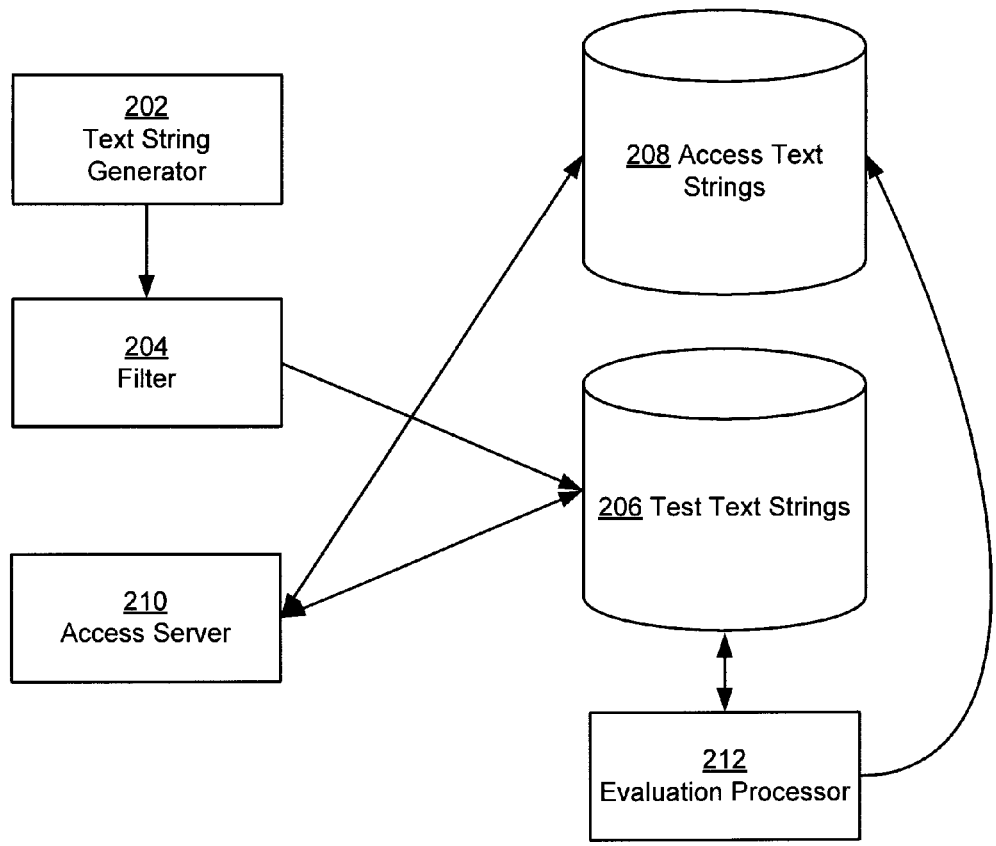
FIG. 2 is an exemplary block diagram of an illustrative system for generating and evaluating text-based strings.

FIG. 2 is an exemplary block diagram of an illustrative system 200 for generating and evaluating text-based strings for use to present to users to gain access to a computing service. The system 200 may include text string generator 202, a filter 204, a test text string store 206, an access text string store 208, an access server 210 and an evaluation processor 212. The system 200 may be configured to interact and communicate with other systems and networks. For example, the access server 210 may be in communication with other servers and networks such as, for example, a mail server, a web server, an application server, or other severs. The access server 210 may be configured to operate in coordination with one or more of these other servers.

The text string generator 202 may be configured to generate the text strings. The text string generator 202 may be implemented in hardware, software, or a combination of hardware and software. In one exemplary implementation, the text string generator 202 may include a processor and a tangible storage medium, where the storage medium includes instructions that, when executed, cause the processor to perform its functionality.

The text string generator 202 may generate the text strings by selecting a random sequence of characters, selecting a font, selecting a distortion algorithm and then applying the font and the distortion algorithm to the random sequence of characters. There are any number of different distortion algorithms that may be used. For example, several "distractor" lines may be drawn through the text (e.g., horizontally and/or vertically) at various angles. The text may be "rippled" by converting the text into an image and then shifting the pixels. For instance, one or more of the pixel columns may be shifted up or down by a small amount. The pixel shifting may be performed left to right or right to left. In one instance, the pixel shift may follow a sine wave function to induce a wavy pattern over the text. Other types of algorithms are also possible.

Text strings generated by the text string generator 202 may be known, meaning that the characters in theses text strings are known. When users provide input to these text strings, the characters input by the users can be compared against the known characters in the text strings.

In one exemplary implementation, the results from the text string generator 202 may be communicated to the filter 204. In other exemplary implementations, the results from the text string generator 202 may be communicated to the test text strings store 206.

The filter 204 may be configured to pre-screen the resulting text strings from the text string generator 202 to determine if any of the text strings are too easy for a machine or non-human to figure out. For instance, the filter 204 may be configured to apply a character recognition algorithm or other recognition type program to attempt to determine the characters in the text string. If the applied recognition program determines the characters, then the text string is discarded as too easy for a machine to determine and thus, it is not even evaluated as one of the test strings. If the applied recognition program is not able to determine the characters correctly, then the text string is communicated to the test text string store 206, where it is stored until the access server 210 selects it for presentation to users as a test text string. Because the applied recognition program cannot recognize the characters, the text string is potentially a good candidate as an access text string. However, it also may be too difficult for humans to recognize the characters. Thus, the text string is validated by being presented to at least a threshold number of users to determine if it is too hard for humans to recognize the characters or if it is a good candidate to use as an access string.

The test text string store 206 may be configured to store the test text strings that are received from the filter 204 and/or directly from the text string generator 202, if the filter is bypassed. The test text string store 206 may be implemented as a database on a computing device having a processor and a tangible storage medium for storing the test text strings. The test text strings may be stored here during the period that statistics are being collected about the test text strings when they are presented to users.

The test text strings store 206 may be configured to store the font type, distortion algorithm and other information for each text string that was used to create the text string. In this manner, once the inputs from the users are received and evaluated for the test string, the system 200 will have information regarding which combinations of font and distortion algorithms make good access text candidates and which combinations of font and distortion algorithms do not make good access text candidates.

The access text strings store 208 may be configured to store the access text strings that have been determined to be good candidates to use for access to a computing service. The access text string store 208 may be implemented as a database on a computing device having a processor and a tangible storage medium for storing the access text strings.

The access server 210 may be configured to select access text strings from the access text strings store 208 and test text strings from the test text strings store 206 for presentation to users. The access server may be implemented in hardware, software or a combination of hardware and software. In one exemplary implementation, the access server 210 may include a processor and a tangible storage medium, where the storage medium includes instructions that, when executed, cause the processor to perform the functions of the access server. For instance, the access server 210 may receive requests to grant access to different computing services. As discussed above, the access server 210 may communicate with other types of servers. In some implementations, the access server 210 also may function as another type of server such as, for example a mail server, a web server, an online application server, or other type of online computer server.

When the access server 210 receives a request for access, the access server 210 may select at least one access text string from the access text strings store 208 and at least one test text string from the test text strings store 206. The access server 210 presents the selected text strings to the user, as discussed above with respect of FIGS. 1A-1D. The access server 210 is configured to receive the inputs from the user with respect to the test string and the access string. The access server 210 compares the input received corresponding to the access string and, if it matches, then the access server 210 grants the user access to the computing service. If the input for the access string does not match, then access is denied and the access server 210 may present another access string and another test string again.

The access server 210 also is configured to receive the input related to the test string. The access server 210 may collect the input for the test string and communicate it to be stored in the test text strings store 206 for later validation by the evaluation processor 212. The access server 210 may be configured to compare the received input to determine if the user correctly identified the characters in the test string. The result of the comparison may be stored and associated with the test string in the test text strings store 206. In one exemplary implementation, the access server 210 may be configured to discard the input related to the test string if the input related to the access string is incorrect. In another exemplary implementation, the access server 210 may be configured to retain the input related to the test string if the input related to the access string is incorrect.

The access server 210 may be configured to select the same test text string from the test text strings store 206 for presentation to multiple users. The same test text string may be paired with different access text strings. The access server 210 may be configured to present the same test text string to at least a threshold of users. The threshold may be configured at a level so that a statistically valid sample is received.

Once the threshold for the statistically valid sample has been reached, the evaluation processor 212 may be configured to evaluate the received inputs for a particular test text string. The evaluation processor 212 may be implemented in hardware, software, or a combination of hardware and software. In one exemplary implementation, the evaluation processor 212 may include a processor and a tangible storage medium, where the storage medium includes instructions that, when executed, cause the processor to perform the functions described for the evaluation processor.

The evaluation processor 212 may perform statistical analysis on the received inputs to determine whether the test text string is a good candidate. The inputs stored in the test text strings 206 may be a count of the number of users that input the characters correctly and a count of the number of users that did not input the characters correctly. The counts may be analyzed to determine a variance on the answer. In one exemplary implementation, statistical methodologies that determine a measure of significance may be used to determine a good variance such that the number of users that input the characters correctly is statistically significant to warrant the test string being used as an access string. If the evaluation processor 212 determines that the test string is a good candidate, then the evaluation processor 212 causes the test string to be stored in the access text strings store 208 for later use by the access server 210 as an access string. Statistical methodologies may include, for example, the T-test, ANOVA or other statistical measures of significance.

In another exemplary implementation, the evaluation processor 212 may use a hard number to determine whether or not the test string is a good candidate. For example, after the test string has been presented to N users, then a good candidate is a test string where X % of the N users input the characters correctly. For example, X may be 90 such that a good candidate for an access string is one in which 90% of the N users correctly input the characters.

The evaluation processor 212 also may be configured to determine which distortion or obscuring algorithms may be good for generating text strings that can be used as access text strings. The evaluation processor 212 also may be configured to determine which distortion or obscuring algorithms may not be good for generating text strings that can be used as access text strings because the text strings are too difficult for users to solve. The evaluation processor 212 may use the results from the users input and the results of the statistical analysis to make these determinations.

Figure 3A:
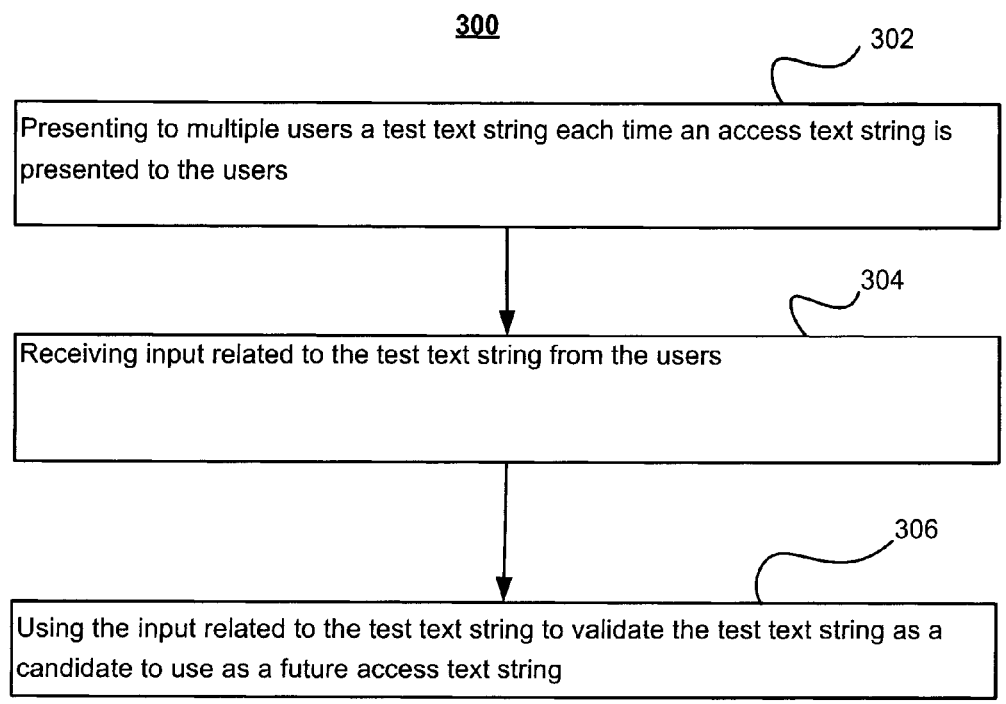
FIG. 3A is a flowchart of an example process for evaluating text-based strings.

FIG. 3A is a flowchart of an example process 300 for evaluating text-based strings. In general, the process 300 involves presenting a test string to multiple users and statistically evaluating the inputs related to the test string to determine whether or not a human can identify the characters in the test string, and to thus conclude that the test string is a good candidate to use as a future access string.

Process 300 may include presenting to multiple users a test text string each time an access text string is presented to the users (302). As discussed above with respect to FIGS. 1A-1D and FIG. 2, an access server 210 may be configured to receive requests for access to a computing service. In response to the requests, the access server 210 may select at least one access text string from the access text strings store 208 and at least one test text string from the test text strings store 206. The same selected test text string may be presented to multiple users each time one of the selected access text strings is presented to the users.

Process 300 also includes receiving input related to the test text string from the users (304). The access server 210 may be configured to receive the input related to the test text string. The input may include the characters input by the users. The access server 210 may be configured to determine if the characters entered match the test text string. The input related to the test text string is used to validate the test text string as a candidate to use as a future access text string (306). For example, once a statistically valid number of inputs have been received, the evaluation processor 212 may be configured to validate the test text string as a candidate to use as a future access string. As discussed above, the evaluation processor 212 may apply one or more statistically methodologies to validate the test string. If the test string is validated, the evaluation processor 212 may cause the test string to be stored in the access text strings store 208 for later use by the access server 210 as an access string.

Figure 3B:
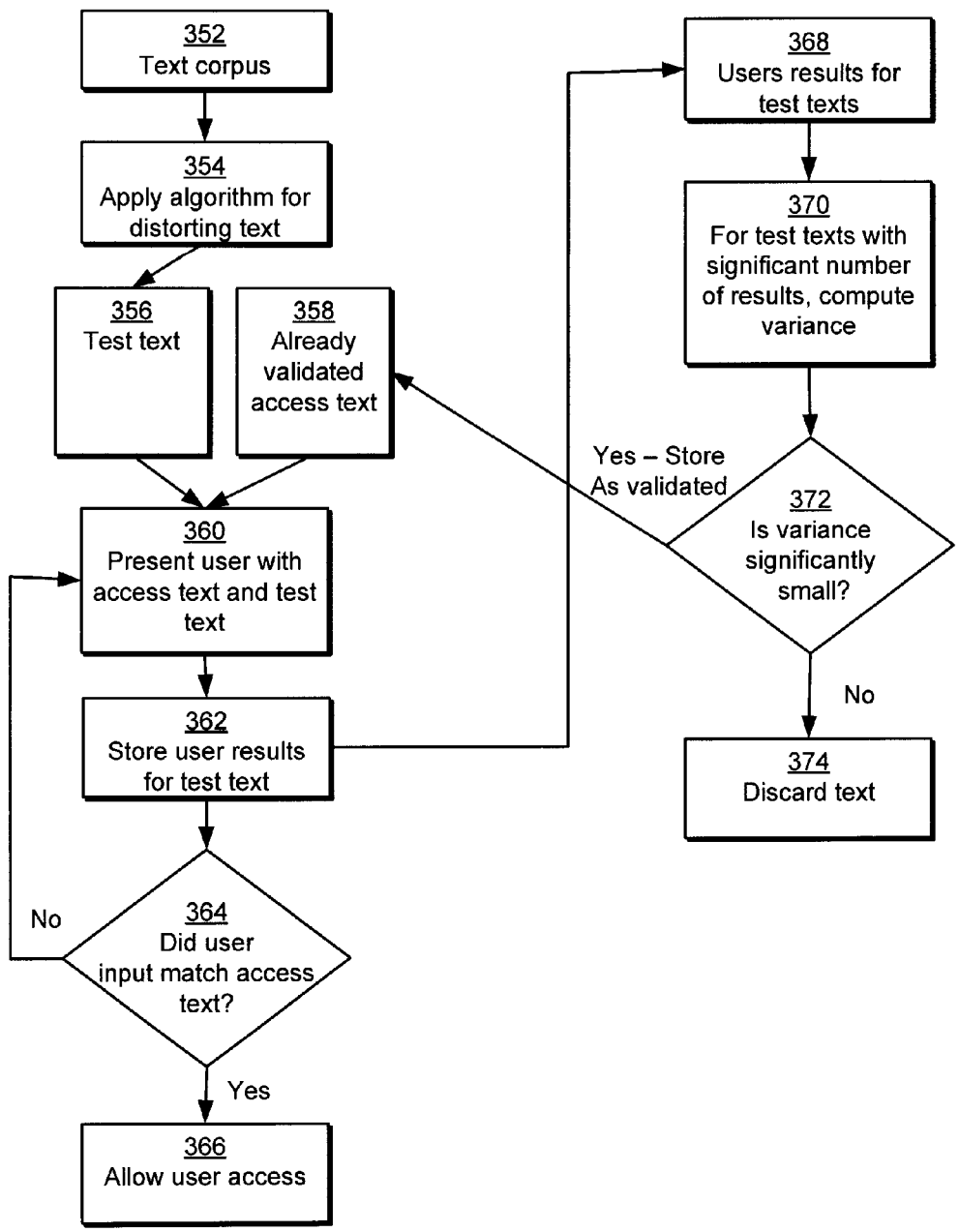
FIG. 3B is a flowchart of example processes for presenting text-based strings to users and evaluating results of stored test text strings.

Referring to FIG. 3B, a process 350 is illustrated for generating the text strings, presenting the text strings to users and for evaluating the results of the test text strings. Process 350 includes using a text corpus (352). The text corpus may include strings of text, including randomly and/or automatically generated strings of text. The text corpus may generated by the text string generator 202 of FIG. 2. Then, a distortion or an obscuring algorithm may be applied to the text strings (354). As discussed above, the text string generator 202 may be configured to apply the distortion or obscuring algorithm to the text strings.

The resulting test text strings are stored in the test text strings store (356). For instance, the test text strings may be stored in the test text strings store 206 of FIG. 2. In response to a request from a user (e.g., a request for access to a computing service), the user is presented with access text from the already validated access text (358) and with a test text (360). The access server 210 may be configured to present the user with the different text strings in a manner described with respect to FIGS. 1A-1D. The access server 210 may select an access text string from the access text strings store 208 and a test text string from the test text strings store 206.

The user result for the test text strings is stored (362). For example, the result for the test text string may be stored in the test text strings store 206. The user result for the access text string is matched against the actual access text characters (364) and if the user input is a match, then the user is allowed access (366). If the user input is not a match, then the user is presented with another access text string and another test text string (360). The access server 210 may be configured to determine if the user input is a match to the access text and to grant or deny access as the case may be.

The user input for the test text strings is stored (368) and for test texts with a significant number of results, the variance is computed (370). In this manner, lots of user inputs to a particular test text string are stored (368) before the results are analyzed for variance. The computation of the variance may be performed by the evaluation processor 212. If the evaluation processor 212 determines that the variance is significantly small (372), then the test text string is stored as a validated access text string (358). If the evaluation processor 212 determines that the variance is not significantly small (372), then the text string is discarded 374).

Figure 4:
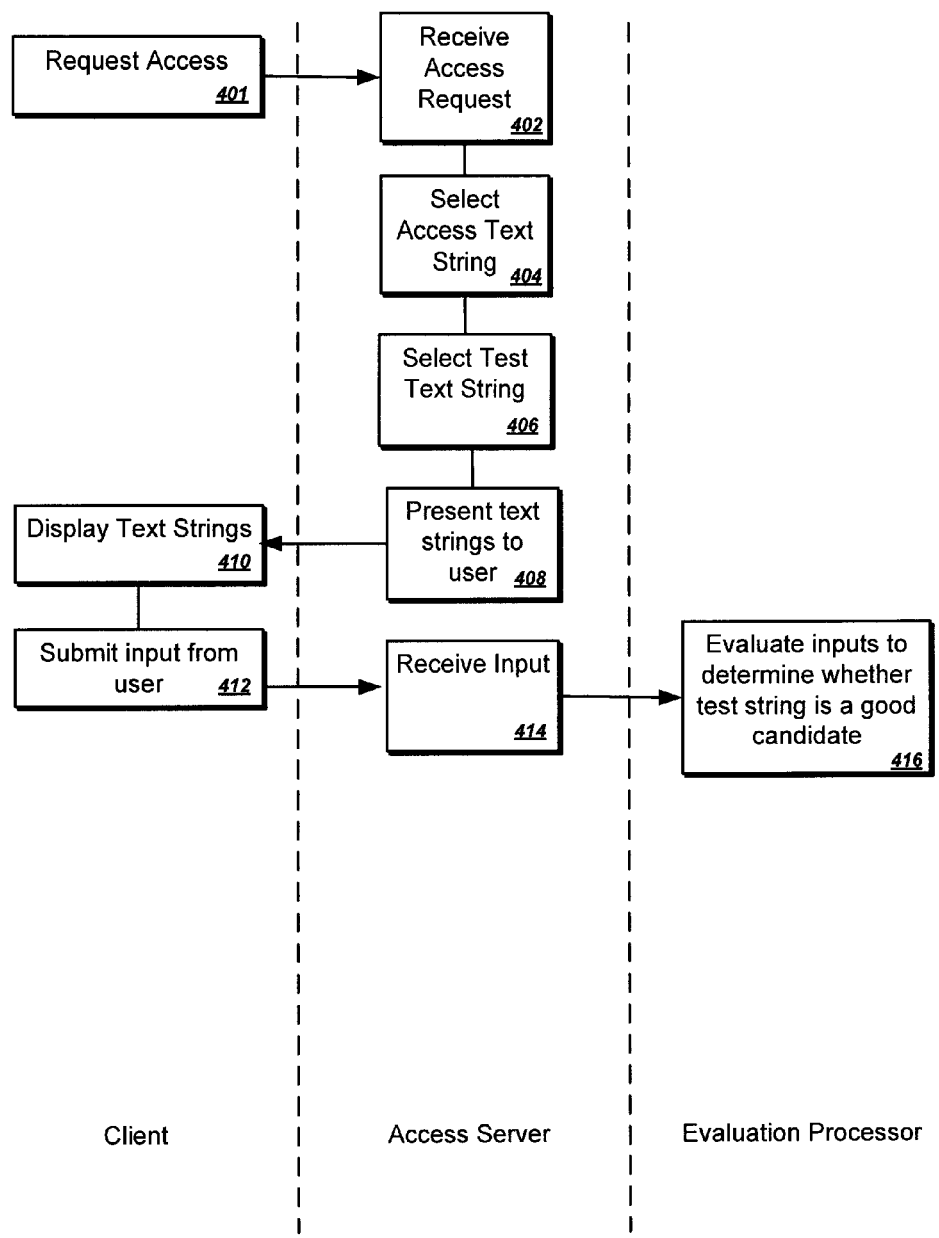
FIG. 4 is a swim lane diagram of an example process for evaluating text-based strings.

FIG. 4 is a swim lane diagram of an example process 400 for evaluating text strings. A client may request access to a computing service (401). The request may or may not be directly requested to the access server. Instead, the request may be made to another server such as, for example, a web server or an email server, and that server may communicate the request to the access server.

The access server may receive the access request (402). In response to receiving the access request, the access server may select an access text string (404) and a test text string (406). In one exemplary implementation, one or more buffers may be used between the access server and the text strings stores 206 and 208 to store a number of text strings so that the access server may respond to access requests in a quick manner. The access server presents the text strings to the user (408) and the client displays the text strings (410). For example, the client may display the text strings in the same or a similar manner as illustrated in FIGS. 1A-1D. Instructions also may be presented to the user to instruct the user to input the displayed characters. The client submits the input of the characters received from the user (412) and the access server receives the submitted input (414). If the input related to the access string matches the access string, then the client is granted access to the requested computing service. If the input related to the access string does not match the access string, then the client is denied access to the requested computing service.

The input related to the test string is stored and when a threshold number of inputs for the test string have been reached, then the evaluation processor evaluates the inputs to determine whether the test string is a good candidate to be used as an access string (416).

Figure 5:
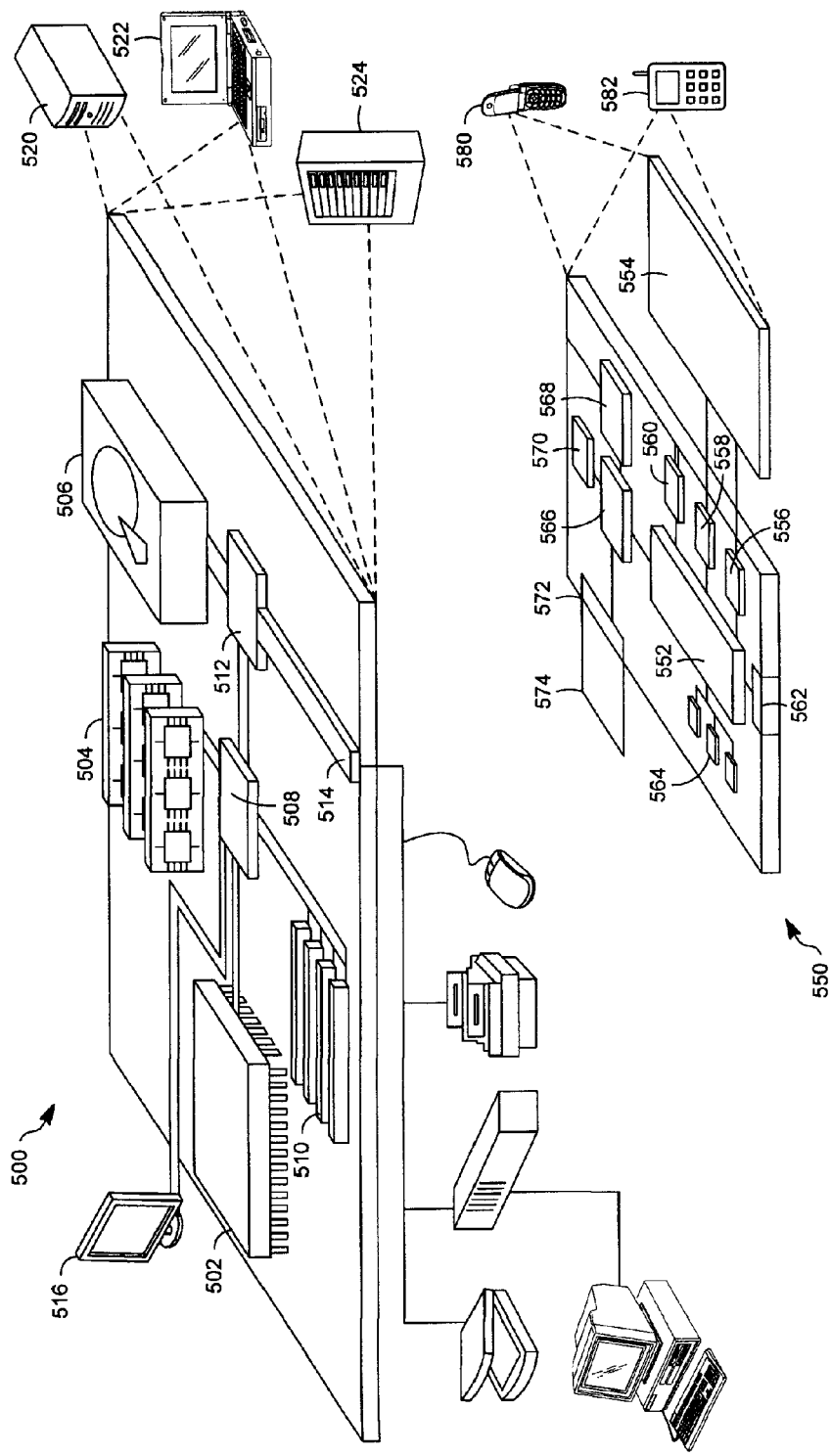
FIG. 5 shows an example of a computer device and a mobile computer device that can be used to implement the techniques described here.

FIG. 5 shows an example of a generic computer device 500 and a generic mobile computer device 550, which may be used with the techniques described here. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD (Thin-Film-Transistor Liquid Crystal Display) or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552, that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smart phone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method, comprising:
presenting to a user a first text string and a second text string, wherein the first text string is designated as an access string for use in providing access to a computing service and the second text string is designated as a test string for use only in evaluating the second text string as a future candidate to use for providing access;
receiving a first input and a second input by the user;
comparing by an access processor the first input to the first text string;
providing access to the computing service based on the comparison by the access processor of the first input to the first text string; and
using by an evaluation processor the second input as part of validating the second text string as a future candidate to use for providing access.

2. The computer-implemented method of claim 1 wherein using by the evaluation processor the second input comprises:
collecting the second input and other inputs from multiple other users related to the second text string; and
performing a statistical analysis by the evaluation processor on the second input and the other inputs related to the second text string to validate the second text string as a candidate to use for providing access.

3. The computer-implemented method of claim 2 wherein performing the statistical analysis comprises determining a variance by the evaluation processor.

4. The computer-implemented method of claim 1 wherein the first text string and the second text string are each automatically generated and distorted text strings.

5. The computer-implemented method of claim 1 wherein presenting to the user the first text string and the second text string comprises presenting to the user the first text string and the second text string side-by-side.

6. The computer-implemented method of claim 1 wherein presenting to the user the first text string and the second text string comprises temporally presenting to the user the first text string and the second text string.

7. The computer-implemented method of claim 1 wherein presenting to the user the first text string and the second text string comprises presenting to the user the first text string and the second text string by randomly varying a position in which the first text string and the second text string are presented.

8. The computer-implemented method of claim 1 further comprising:
    denying access to the computing service by the access processor when the first input does not match the first text string; and
    not using the second input to validate the second text string as a candidate to use for providing access.

9. The computer-implemented method of claim 1 further comprising:
    denying access to the computing service by the access processor when the first input does not match the first text string; and
    using the second input to validate the second text string as a candidate to use for providing access.

10. A non-transitory recordable storage medium having recorded and stored thereon instructions that, when executed, perform the actions of:
    presenting to a user a first text string and a second text string, wherein the first text string is designated as an access string for use in providing access to a computing service and the second text string is designated as a test string for use only in evaluating the second text string as a future candidate to use for providing access;
    receiving a first input and a second input by the user;
    comparing the first input to the first text string;
    providing access to the computing service based on the comparison of the first input to the first text string; and
    using the second input as part of validating the second text string as a future candidate to use for providing access.

11. The recordable storage medium of claim 10 wherein instructions that, when executed, perform the action of using the second input comprise instructions that, when executed, perform the actions of:
    collecting the second input and other inputs from multiple other users related to the second text string; and
    performing a statistical analysis on the second input and the other inputs related to the second text string to validate the second text string as a candidate to use for providing access.

12. The recordable storage medium of claim 11 wherein instructions that, when executed, perform the action of performing the statistical analysis comprise instructions that, when executed, perform the action of determining a variance.

13. The recordable storage medium of claim 10 wherein the first text string and the second text string are each randomly generated and distorted text strings.

14. The recordable storage medium of claim 10 wherein instructions that, when executed, perform the action of presenting to the user the first text string and the second text string comprise instructions that, when executed, perform the action of presenting to the user the first text string and the second text string side-by-side.

15. The recordable storage medium of claim 10 wherein instructions that, when executed, perform the action of presenting to the user the first text string and the second text string comprise instructions that, when executed, perform the action of temporally presenting to the user the first text string and the second text string.

16. The recordable storage medium of claim 10 wherein instructions that, when executed, perform the action of presenting to the user the first text string and the second text string comprise instructions that, when executed, perform the action of presenting to the user the first text string and the second text string by randomly varying a position in which the first text string and the second text string are presented.

17. The recordable storage medium of claim 10 further comprising instructions that, when executed, perform the actions of:
    denying access to the computing service when the first input does not match the first text string; and
    not using the second input to validate the second text string as a candidate to use for providing access.

18. The recordable storage medium of claim 10 further comprising instructions that, when executed, perform the actions of:
    denying access to the computing service when the first input does not match the first text string; and
    using the second input to validate the second text string as a candidate to use for providing access.

19. A computer-implemented method, comprising:
    presenting to multiple users a test text string each time an access text string is presented to the users, wherein the access text string is for use in providing access to a computing service and the test text string is for use only in evaluating the test text string as a future access text string;
    receiving input related to the test text string from the users; and
    using by an evaluation processor the input related to the test text string to validate the test text string as a candidate to use as a future access text string.

20. The computer-implemented method of claim 19 further comprising:
    receiving input related to the access text string from the users;
    comparing by an access processor the input related to the access text string; and
    providing access to a computing service by the access processor when the input related to the access text string matches the access text string.

21. The computer-implemented method of claim 19 wherein using by the evaluation processor the input related to the test text string comprises performing a statistical analysis on the input related to the test string by the evaluation processor to validate the test text string as a candidate to use as a future access string.

22. The computer-implemented method of claim 19 further comprising using by the evaluation processor the input related to the test text string to validate a distortion algorithm used to generate the test text string.

23. A non-transitory recordable storage medium having recorded and stored thereon instructions that, when executed, perform the actions of:
    presenting to multiple users a test text string each time an access text string is presented to the users, wherein the access text string is for use in providing access to a computing service and the test text string is for use only in evaluating the test text string as a future access text string;
    receiving input related to the test text string from the users; and
    using the input related to the test text string to validate the test text string as a candidate to use as a future access text string.

24. The recordable storage medium of claim 23 further comprising instructions that, when executed, perform the actions of:
    receiving input related to the access text string from the users;
    comparing the input related to the access text string; and providing access to a computing service when the input related to the access text string matches the access text string.

25. The recordable storage medium of claim 23 wherein the instructions that, when executed, perform the actions of using the input related to the test text string comprise instructions that, when executed, perform the actions of performing a statistical analysis on the input related to the test string to validate the test text string as a candidate to use as a future access string.

26. The recordable storage medium of claim 23 further comprising instructions that, when executed, perform the actions of using the input related to the test text string to validate a distortion algorithm used to generate the test text string.

27. A computer-implemented text string evaluation system, comprising:
   an access server that is configured to receive requests for access, to present access text strings and test text strings to users, and to receive input related to the access text strings and input related to the test text strings from the users, wherein the access text strings are for use in providing access to a computing service and the test text strings are for use only in evaluating the test text strings as future access text strings; and
   an evaluation processor that is configured to use the input related to the test text strings to validate the test text strings as candidates to use as future access text strings.

28. The system of claim 27 further comprising a text string generator that is configured to generate text strings by randomly selecting characters, selecting a font, selecting a distortion algorithm and applying the selected font and the selected distortion algorithm to the randomly selected characters.

29. The system of claim 28 further comprising a filter that is operably coupled with the text string generator and that is configured to determine whether the text strings generated by the text string generator are readable by a non-human.

30. The system of claim 28 wherein the evaluation processor is further configured to use the input related to the test text strings to validate the distortion algorithm used to generate the test text strings.

* * * * *